United States Patent
Takakura

(10) Patent No.: US 11,192,663 B2
(45) Date of Patent: Dec. 7, 2021

(54) SHEARING MACHINE FOR DISMANTLING A LARGE AIRCRAFT AND WORKING VEHICLE FOR DISMANTLING A LARGE AIRCRAFT

(71) Applicant: NIHON SOUGOU RECYCLE CO., LTD., Takaoka (JP)

(72) Inventor: Yoshiaki Takakura, Toyama (JP)

(73) Assignee: NIHON SOUGOU RECYCLE CO., LTD., Takaoka (JP)

( * ) Notice: Subject to any disclaimer, the term of this patent is extended or adjusted under 35 U.S.C. 154(b) by 21 days.

(21) Appl. No.: 16/344,628

(22) PCT Filed: Oct. 30, 2018

(86) PCT No.: PCT/JP2018/040307
§ 371 (c)(1),
(2) Date: Apr. 24, 2019

(87) PCT Pub. No.: WO2019/167339
PCT Pub. Date: Sep. 6, 2019

(65) Prior Publication Data
US 2020/0062422 A1 Feb. 27, 2020

(30) Foreign Application Priority Data

Feb. 27, 2018 (JP) .............................. JP2018-033247

(51) Int. Cl.
*B23D 17/00* (2006.01)
*B64F 5/00* (2017.01)
(Continued)

(52) U.S. Cl.
CPC ................ *B64F 5/00* (2013.01); *B23D 17/00* (2013.01); *B23D 23/00* (2013.01); *B23D 31/008* (2013.01); *B23D 35/001* (2013.01); *E02F 3/965* (2013.01)

(58) Field of Classification Search
CPC ........ B23D 17/00; B23D 15/00; B23D 31/00; B23D 31/008; B30B 9/326; E04G 23/082; E02F 3/965
(Continued)

(56) References Cited

U.S. PATENT DOCUMENTS 3,570,356 A * 3/1971 Williams ............. B23K 11/046
                                                   83/693
4,670,983 A * 6/1987 Ramun ................. B23D 17/06
                                                   30/134
(Continued)

FOREIGN PATENT DOCUMENTS

CA 2387725 A1 * 4/2001 ............. A62B 3/005
DE 4205781 A1 9/1993
(Continued)

OTHER PUBLICATIONS

Translation of DE-4205781-A1 (Year: 1993).*
(Continued)

*Primary Examiner* — Kenneth E Peterson
(74) *Attorney, Agent, or Firm* — Manabu Kanesaka

(57) ABSTRACT

As shearing blades of a first jaw portion, a shearing machines includes: a tip blade; a pair of first parallel shearing blades bent at an obtuse angle to the biting direction of the tip blade and disposed both sides of the blade width; and a pair of second parallel shearing blades bent at an obtuse angle to an attaching portion of the first parallel shearing blades and disposed on both sides of the blade width. As a tip blade, the shearing machine includes: a point blade a pair of tip tapered blades disposed on both sides of an end portion and whose blade width is increased toward the rear end; and a pair of tapered blades bent at an obtuse
(Continued)

angle to an attaching portion of the rear end portion of the tip tapered blades and disposed toward the first parallel shearing blades.

5 Claims, 5 Drawing Sheets

(51) Int. Cl.
  *B23D 35/00* (2006.01)
  *B23D 23/00* (2006.01)
  *B23D 31/00* (2006.01)
  *E02F 3/96* (2006.01)
(58) Field of Classification Search
  USPC .......................................................... 72/330
  See application file for complete search history.

(56) References Cited

U.S. PATENT DOCUMENTS

| | | | | |
|---|---|---|---|---|
| 4,729,273 | A * | 3/1988 | Fazis | B23D 15/002 144/217 |
| 4,776,093 | A * | 10/1988 | Gross | B23D 17/00 30/134 |
| 5,187,868 | A | 2/1993 | Hall | |
| 5,339,525 | A | 8/1994 | Morikawa | |
| 5,531,007 | A | 7/1996 | Labounty | |
| 5,619,881 | A * | 4/1997 | Morikawa | B23D 17/00 30/134 |
| 6,926,217 | B1 | 8/2005 | LaBounty | B23D 17/00 241/101.73 |
| 10,286,400 | B2 | 5/2019 | Brouwers et al. | |
| 2005/0150343 | A1 * | 7/2005 | Deimel | B23D 31/008 83/607 |
| 2008/0072434 | A1 * | 3/2008 | Clemons | B23D 35/001 30/134 |
| 2009/0145274 | A1 * | 6/2009 | Mikrut | E04G 23/082 83/53 |
| 2014/0131494 | A1 * | 5/2014 | De Gier | E02F 3/965 241/101.71 |
| 2014/0319257 | A1 * | 10/2014 | Clemons | E02F 3/965 241/266 |
| 2015/0308075 | A1 | 10/2015 | Christenson et al. | |

FOREIGN PATENT DOCUMENTS

| | | | | |
|---|---|---|---|---|
| EP | 0596285 | A1 | 5/1994 | |
| EP | 3121340 | A1 | 1/2017 | |
| JP | H06-092705 | A | 4/1994 | |
| JP | H11-505772 | A | 5/1999 | |
| JP | 2001-058134 | A | 3/2001 | |
| JP | 2003266369 | A * | 9/2003 | ............ E02F 3/965 |
| JP | 2007-307646 | A | 11/2007 | |
| JP | 2011-036981 | A | 2/2011 | |
| RU | 105210 | U1 | 6/2011 | |
| RU | 2420373 | C2 | 6/2011 | |

OTHER PUBLICATIONS

Russia Patent Office, "Decision of Grant for Russian Patent Application No. 2019110258," dated Dec. 13, 2019.
Europe Patent Office, "Search Report for European Patent Application No. 18847264.1," dated May 29, 2020.
PCT/ISA/237, "Written Opinion of the International Searching Authority for International Application No. PCT/JP2018/040307," dated Dec. 25, 2018.
PCT/ISA/210, "International Search Report for International Application No. PCT/JP2018/040307," dated Dec. 25, 2018.
PCT/IB/310, "Notification concerning documents transmitted for International Application No. PCT/JP2018/040307," dated May 14, 2019.

* cited by examiner

Fig. 3(a)
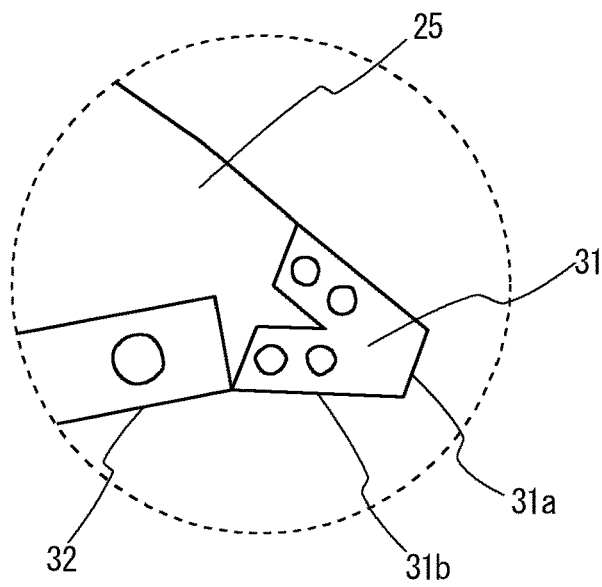
Fig. 3(b)
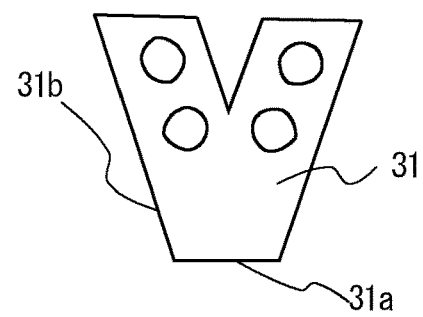
Fig. 3(c)
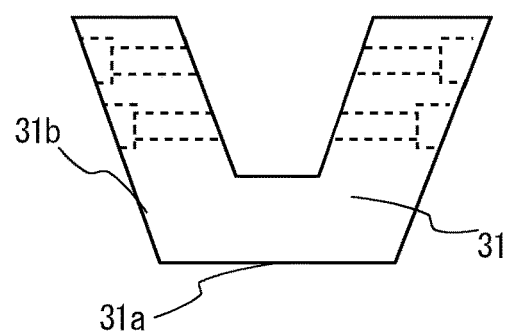
Fig. 3(d)
Fig. 3(e)
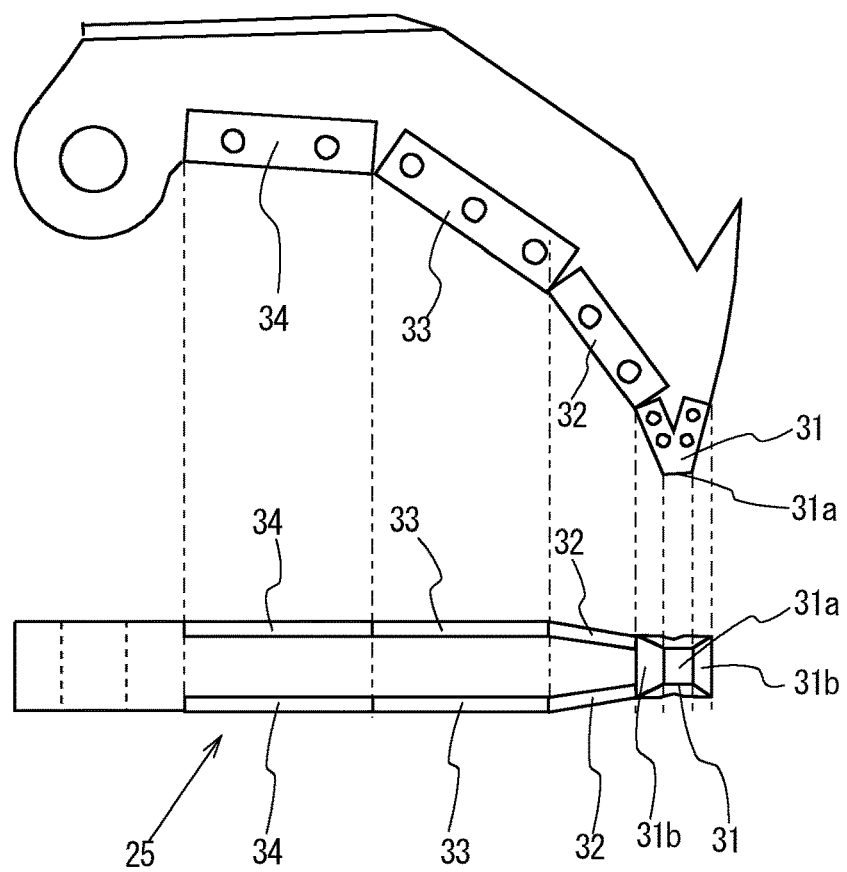

Fig. 4(a)
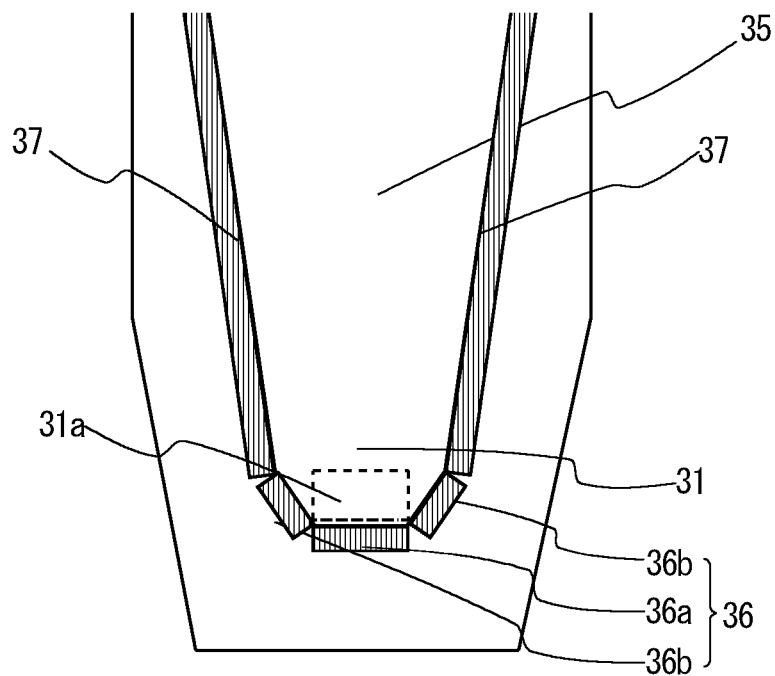
Fig. 4(b)
Fig. 4(c)
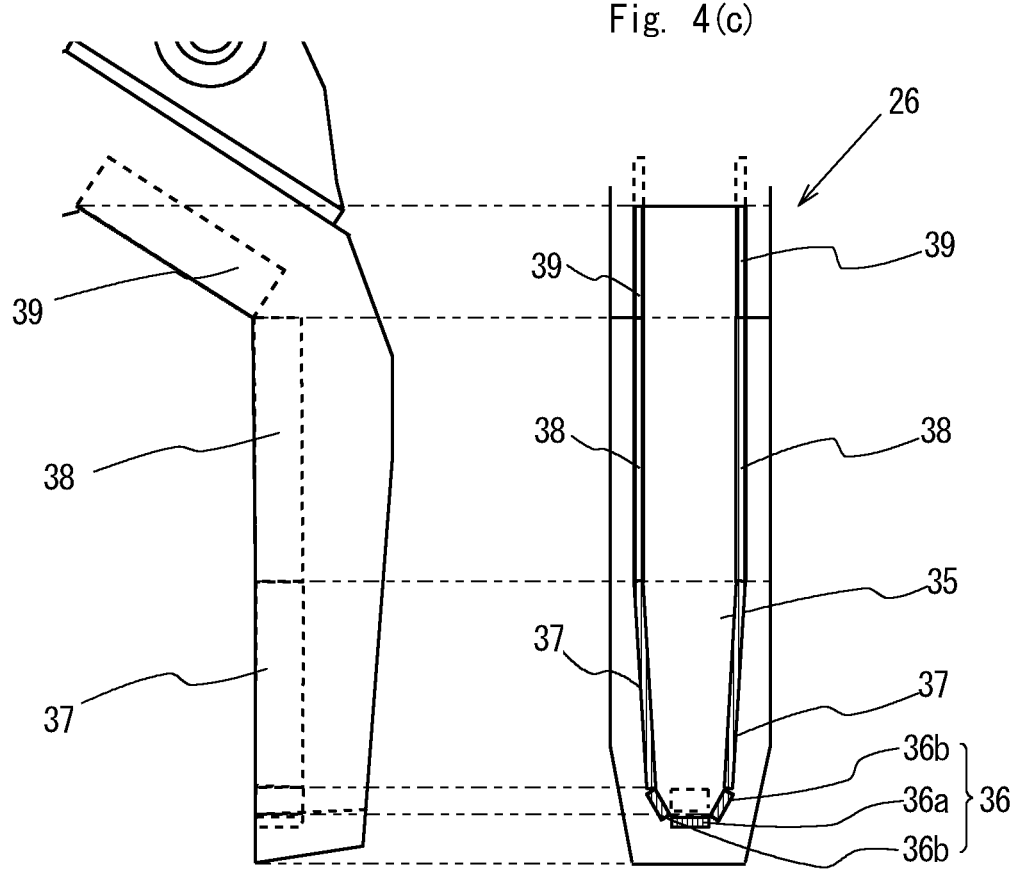

Fig. 6(a)
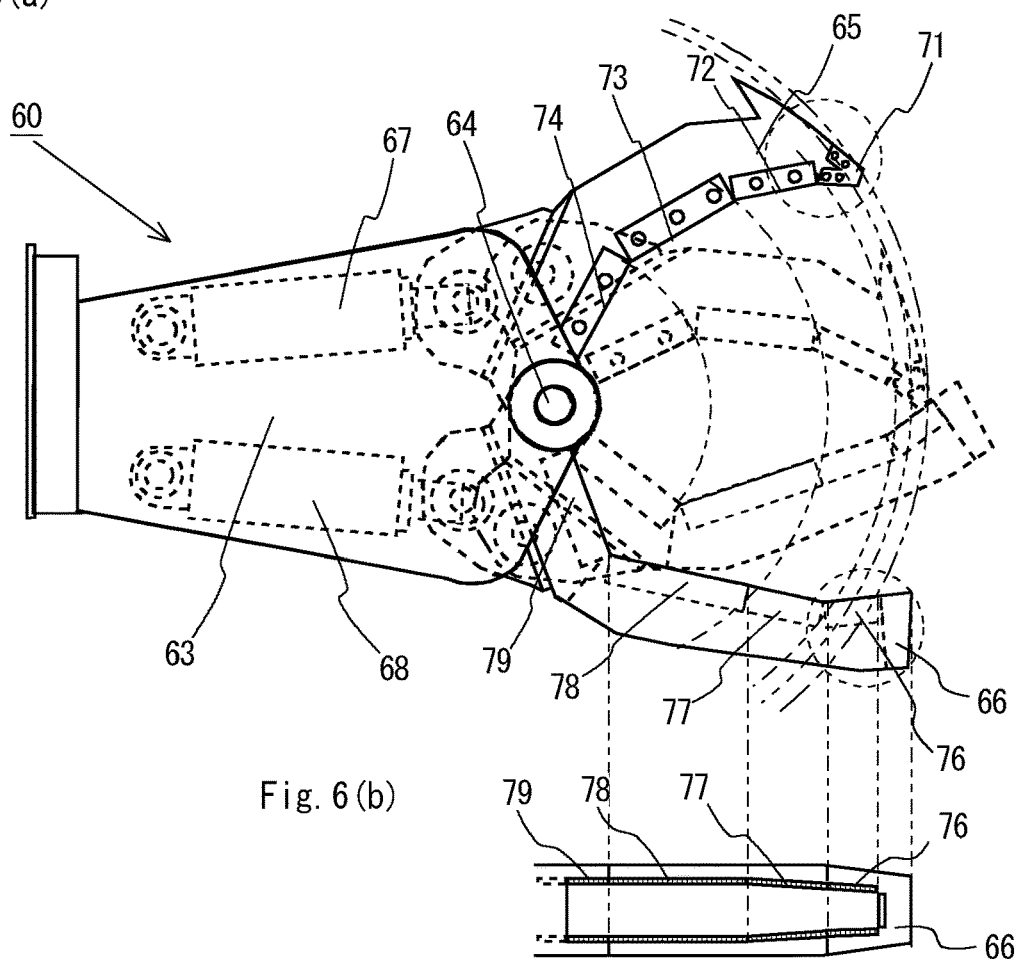
Fig. 6(b)
Fig. 6(c)
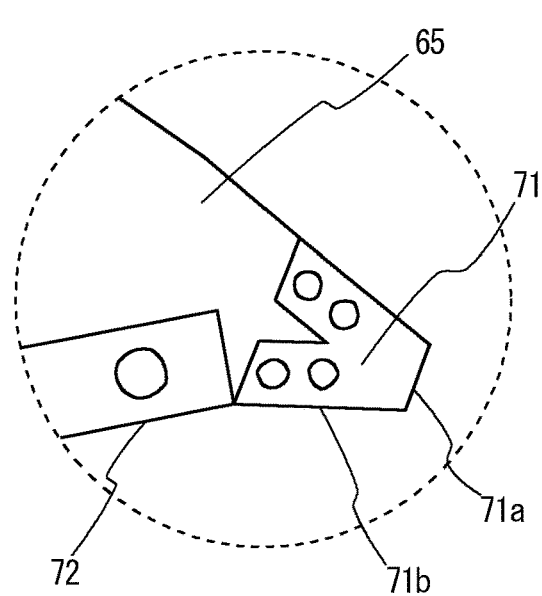
Fig. 6(d)
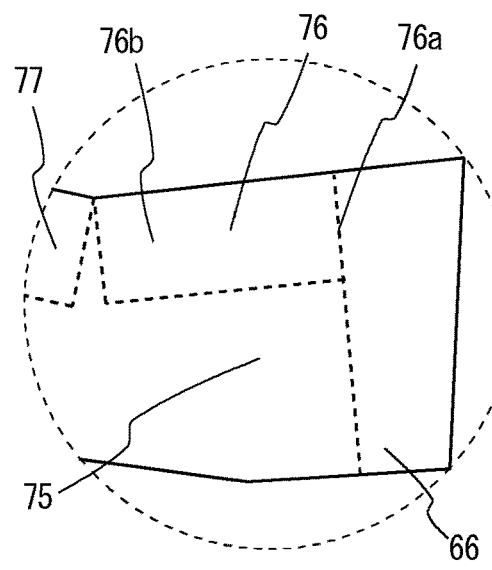

SHEARING MACHINE FOR DISMANTLING A LARGE AIRCRAFT AND WORKING VEHICLE FOR DISMANTLING A LARGE AIRCRAFT

RELATED APPLICATION

The present application is National Phase of International Application No. PCT/JP2018/040307 filed Oct. 30, 2018, and claims priority from Japanese Application No. 2018-033247, filed Feb. 27, 2018, the disclosure of which is hereby incorporated by reference herein in its entirety.

TECHNICAL FIELD

The present invention relates to a shearing machine for dismantling large aircrafts suitable for dismantling large aircrafts, such as airliners, using a high-strength aluminum alloy or the like and a working vehicle for dismantling large aircrafts equipped with the shearing machine.

BACKGROUND ART

In recent years, various objects to be scrapped, including construction waste materials, such as reinforcing bars and window frames for sash windows, and piping waste materials, such as distributing water pipes and water supply pipes, as well as discarded automobiles, have been increasingly accumulated here and there. These objects to be scrapped cannot be coped with by ordinary dismantling work and are waiting for dismantling. Meanwhile, with respect to dismantling and cutting work for marine structures, steel buildings, plants, large vehicles, and the like, cutting machines have been developed. These cutting machines are constructed by equipping an automotive vehicle with a large steel material shearing machine and intended to be dispatched to a cutting work site, cut steel materials or the like and load a truck or the like with the materials, and transport them to an ironworks or the like as raw materials. Such a cutting machine is equipped with a hydraulically actuated boom swivelably and lowerably/raisably mounted on an automotive vehicle and a shearing machine for cutting attached to the tip of the boom and remotely opened and closed.

The shearing machine for cutting includes: a frame that can be attached to a boom structure; a pair of jaws for workpiece destruction having an attaching portion; and a jaw attaching means for attaching these jaws to the frame. The jaw attaching means is for attaching both the jaws to the frame such that the jaws can be mutually swung around a sing axis. The jaw attaching means has a pin portion for detachably attaching the jaws to the attaching portion of the frame. The jaw attaching means has a rotatable coupling portion for integrally holding both the jaws independent of the pin portion and the frame. (Refer to Patent Literature 1, for example.)

As a result, when a scrap to be cut is cut, the scrap to be cut can be cut such that a portion cut from an end face of the scrap is rectangular as viewed in a plane. However, the width of the cut is identical with the width of a jaw for destruction biting inward. A more specific description will be given. When the jaw for destruction of a pair of jaws bites inward, the outside destruction jaw is rubbed against both sides of the former jaw. By rubbing between the cutting edges of these jaws, the scrap to be cut can be continuously cut as if paper were cut with scissors. Therefore, it is possible to save time and labor in cutting a scrap to be cut, such as a steel plate, and enhance the efficiency of the cutting work.

CITATION LIST

Patent Literature

Patent Literature 1: Japanese Patent Publication No. Hei 6(1994)-92705

SUMMARY OF INVENTION

Technical Problem

However, these conventional shearing machines for cutting pose a problem when an aircraft, such as an airliner, using a high-strength aluminum alloy or the like is dismantled. When an attempt is made to pinch and cut a high-strength aluminum alloy, there are cases where a cutting edge does not get into the scrap to be cut at start of shearing and as a result, the alloy cannot be favorably pinched and cut. Especially, in the body and wings, such as a main wing, of an aircraft, riveting is adopted and a large number of rivets are used to join the body and the wings together instead of welding. For this reason, because of riveting, the tip of a cutting edge cannot favorably bite at start of shearing. Even though a cutting edge favorably bites, a large burden is imposed on the cutting edge in a favorable rubbing state and the workpiece cannot be pinched and cut sometimes.

It is an object of the present invention to obtain a shearing machine for dismantling large aircrafts and a working vehicle for dismantling large aircrafts suitable for dismantling large aircrafts, such as airliners, using a high-strength aluminum alloy or the like.

Solution to Problem

A shearing machine for dismantling large aircrafts of the first aspect of the present invention is a shearing machine equipped with: a first jaw portion and a second jaw portion that shear an object to be sheared with shearing blades provided such that the shearing blades are relatively rotated between an open position and a closed position; and a hydraulic driving means that rotates the first jaw portion and/or the second jaw portion.

As the shearing blades of the first jaw portion, the shearing machine includes:

a tip blade that includes a point blade and a pair of tapered blades, has the maximum width as the thickness perpendicular to the rotation direction of the first jaw portion and is positioned in the tip area of the first jaw portion, and whose point bites into an object to be sheared;

a pair of first parallel shearing blades adjoining to the tip blade and disposed in both sides of the first jaw portion; and a pair of second parallel shearing blades each bent at an obtuse angle to an attaching portion of each of the first parallel shearing blades and disposed in both sides of the first jaw portion.

The tip blade includes:

the point blade having an end face that is disposed at the tip of the first jaw portion and is abutted first against an object to be sheared, and whose blade width is smaller than the thickness of the first jaw portion and a pair of tip tapered blades that are disposed on both sides of the end face and whose blade width is continuously increased toward the rear end; and the pair of tapered blades that are bent at an obtuse angle to respective attaching portions of the rear end faces of the tip tapered blades of the point blade and are disposed such that a distance therebetween is increased toward each of the first parallel shearing blades.

As the shearing blades of the second jaw portion, the shearing machine includes:

a groove portion that penetrably receives all of the tip blade and the pair of first parallel shearing blades and part of each of the pair of second parallel shearing blades during relative movement with the first jaw portion;

a tip blade receiving blade disposed on an inner wall surface of the groove portion except an area where the first parallel shearing blades penetrate so as to border on three sides by the outer circumferential surface of the penetrating tip blade;

a pair of first parallel shearing blade receiving blades respectively disposed along the inner wall surface of the groove portion in an area where both the outer circumferential surfaces of the first parallel shearing blades penetrate; and a pair of second parallel shearing blade receiving blades respectively disposed along the inner wall surface of the groove portion in an area where both the outer circumferential surfaces of the second parallel shearing blades penetrate.

In a shearing machine for dismantling large aircrafts of the second aspect of the present invention, the hydraulic drive system in the first aspect of the present invention separately includes a first hydraulic driving means for rotating the first jaw portion and a second hydraulic driving means for rotating the second jaw portion.

In a shearing machine for dismantling large aircrafts of the third aspect of the present invention, the tip blade receiving blade in the first or second aspect of the present invention includes: a width receiving blade opposed to the periphery of the end face of the point blade; a pair of tip tapered blade receiving blades rubbed against the tip tapered blades of the point blade; and a pair of tapered blades receiving blades rubbed against the pair of tapered blades.

In a shearing machine for dismantling large aircrafts of the fourth aspect of the present invention, the point blade receiving blade portion comprised of the width receiving blade of the tip blade receiving blade and the pair of tip tapered blade receiving blades in the third aspect of the present invention is disposed such that the point blade receiving blade portion is inclined from a surface of the second jaw portion opposed to the first jaw portion toward a direction opposed to the first jaw portion.

A working vehicle for dismantling large aircrafts of the fifth aspect of the present invention is constructed by attaching a shearing machine for dismantling aircrafts in the first to fourth aspects of the present invention to the tip of a hydraulically actuated boom swivelably and lowerably/raisably mounted on an automotive vehicle.

Advantageous Effects of Invention

The present invention brings about an advantageous effect that a shearing machine for dismantling large aircrafts and a working vehicle for dismantling large aircrafts suitable for dismantling large aircrafts, such as airliners, using a high-strength aluminum alloy or the like can be obtained.

BRIEF DESCRIPTION OF DRAWINGS

FIGS. 3(a) to 3(c) are an enlarged view, a side view, and a plan view of the tip blade of the first jaw portion of the shearing machine for dismantling large aircrafts shown in FIG. 2, FIG. 3(d) is a side view of the first jaw portion, and FIG. 3(e) is a plan view showing the tip blades of the first jaw portion.

FIG. 4(a) is an enlarged plan view, FIG. 4(b) is a side view, and FIG. 4(c) is a plan view of FIG. 4(b) of the tip blade receiving blade of the second jaw portion shown in FIG. 2.

FIGS. 6(a) to 6(d) are explanatory drawings illustrating a configuration of a shearing machine for dismantling large aircrafts in another implementation.

DESCRIPTION OF EMBODIMENTS

Figure 1:
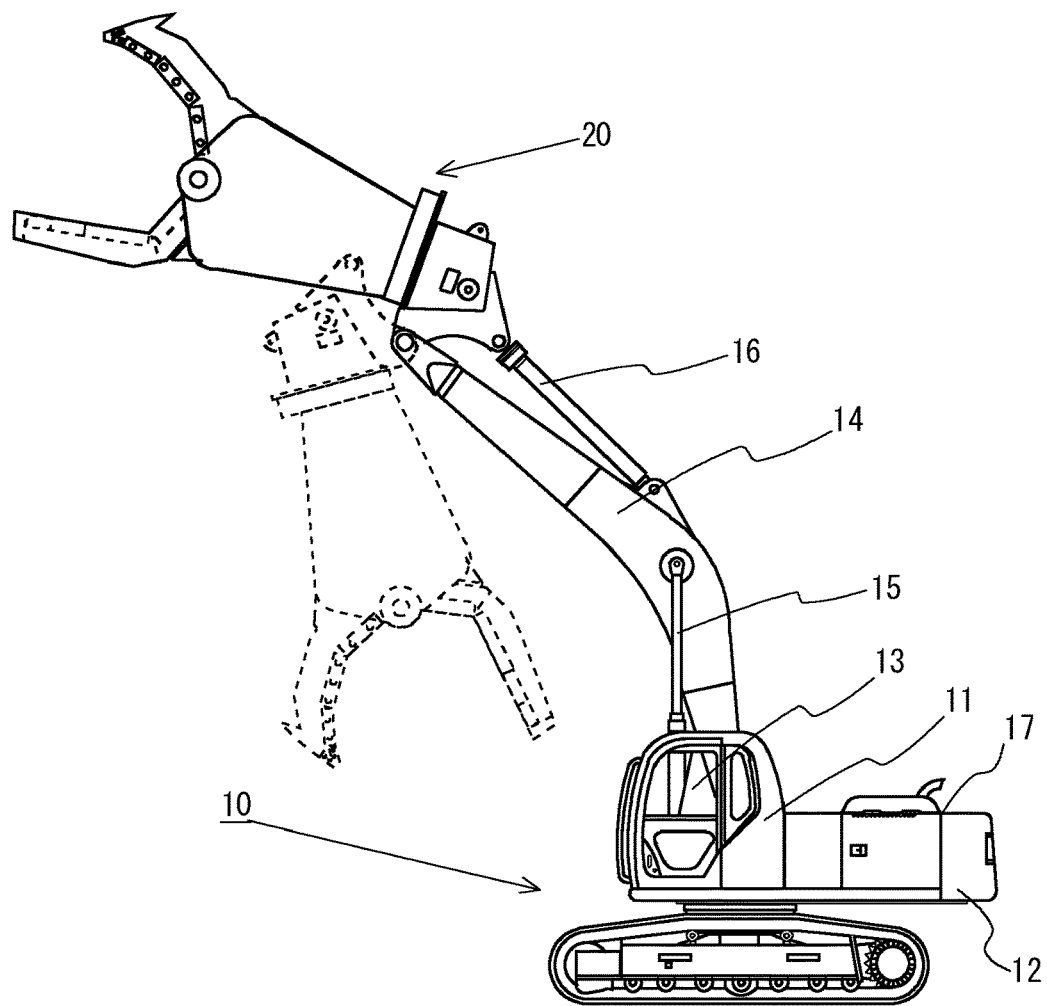
FIG. 1 is an explanatory drawing illustrating a configuration of an implementation of an aircraft for dismantling working vehicle equipped with a shearing machine dismantling large aircrafts of the present invention.

The present invention is a shearing machine equipped with: a first jaw portion and a second jaw portion that shear an object to be sheared with shearing blades outfitted such that the shearing blades are relatively rotated between an open position and a closed position; and a hydraulic driving means that rotates the first jaw portion and/or the second jaw portion. As the shearing blades of the first jaw portion, the shearing machine includes: a tip blade that has a maximum width identical with the thickness of the first jaw portion and whose point bites into an object to be sheared; a pair of first parallel shearing blades adjoining to the tip blade and respectively disposed on both sides of the first jaw portion; and a pair of second parallel shearing blades bent at an obtuse angle to an attaching portion of the first parallel shearing blades and respectively disposed on both sides of the first jaw portion.

Further, as the shearing blades of the second jaw portion, the shearing machines includes: a groove portion that penetrably receives all of the tip blade and the pair of first parallel shearing blades and part of each of the pairs of second parallel shearing blades during relative movement with the first jaw portion; tip blade receiving blades disposed on the inner wall surface of the groove portion except an area where the first parallel shearing blades penetrate so as to border on three sides by the outer circumferential surface of the tip blade; a pair of first parallel shearing blade receiving blades respectively disposed along the inner wall surface of the groove portion in an area where both the outer circumferential surfaces of the first parallel shearing blades penetrate; and a pair of second parallel shearing blade receiving blades respectively disposed along the inner wall surface of the groove portion in an area where both the outer circumferential surfaces of the second parallel shearing blades penetrate.

Thus, the point of the tip blade of the first jaw portion is abutted against an object to be sheared at start of shearing and pressure from the hydraulic drive system can be concentrated on the point. For this reason, a large aircraft, such as an airliner, using a high-strength aluminum alloy or the like can also be dismantled with ease. A more specific description will be given. Only the point of the tip blade of the first jaw portion is abutted against the high-strength aluminum alloy of the large aircraft to apply hydraulic pressure in a concentrated manner. As a result, a pierced hole is formed. Subsequently to the formed pierced hole, favorable shearing can be achieved by the first parallel shearing blades and the first parallel shearing blade receiving blades.

The point of the tip blade of the first jaw portion is substantially perpendicularly pressed against an object to be sheared. Therefore, the point is not displaced from the pressing spot and hydraulic pressure can be favorably concentrated on the pressing spot. A more specific description will be given. To cut the body and wings, such as the main wing, of an aircraft where riveting is adopted instead of welding and a large number of rivets are used to join the body and the wings together, the following procedure is taken. The point of the tip blade of the first jaw portion is pressed against a cutting spot and pressure is concentrated on the point portion. Thus, the point is not displaced from the pressing spot and a pierced hole is easily formed by the point. The high-strength aluminum alloy is sheared by the first parallel shearing blades and second parallel shearing blades behind the tip blade.

Such a shearing machine of the present invention is provided as the tip blade with: a point blade having an end face that is disposed at the tip of the first jaw portion and is abutted first against an object to be sheared and whose blade width is smaller than the thickness of the first jaw portion: a pair of tip tapered blades that are disposed on both side of the end face and whose blade width is continuously increased toward the rear end; and a pair of tapered blades that are bent at an obtuse angle to respective attaching portions of the tip tapered blades of the point blade and are disposed such that a distance therebetween is increased toward the respective first parallel shearing blades.

Thus, the end face of the point blade of the first jaw portion is abutted first against an object to be sheared to pierce a hole in the high-strength aluminum alloy. The pair of tip tapered blades widen the pierced hole and further widen the width of the pierced hole to the width of the first parallel shearing blades while cutting operation is performed with the pair of tapered blades. Thus, a rivet joined part joined with a large number of rivets can be ruptured while a large number of pierced holes are formed by the end face of the point blade by driving the first jaw portion little by little. After the passage by the rivet joined part area, the cut is widened to the width between the first parallel shearing blades while cutting operation is performed with the pair of tapered blades and the high-strength aluminum alloy is sheared by the first parallel shearing blades and the second parallel shearing blades.

The first jaw portion and second jaw portion of a shearing machine of the present invention only have to be so designed that an object to be sheared is sheared with shearing blades outfitted such that the shearing blades are relatively rotated between an open position and a closed position. The first jaw portion and the second jaw portion may be respectively rotated by a hydraulic driving means comprised of a hydraulic piston and a cylinder or only either jaw portion may be rotated by a single hydraulic driving means.

However, when the point of the point blade is substantially perpendicularly pressed against an object to be sheared, the point is not displaced from the pressing spot and pressing force from a hydraulic driving means is favorably concentrated on the pressing spot on the object to be sheared. Therefore, it is desirable to rotate both the first jaw portion and the second jaw portion and adjust an opening/closing angle of the second jaw portion relative to the point of the point blade of the first jaw portion so that the point of the point blade is substantially perpendicularly pressed against even a thick object to be sheared. Hence, a hydraulic drive system of the present invention is preferably separately provided with a first hydraulic driving means for rotating the first jaw portion and a second hydraulic driving means for rotating the second jaw portion.

As a shearing blade of the first jaw portion, a tip blade of the present invention only has to have a maximum width identical with the thickness of the first jaw portion and to be so designed that a point thereof bites into an object to be sheared. A point blade is preferably provided with: an end face that is disposed at the tip of the first jaw portion and is abutted first against an object to be sheared and whose blade width is smaller than the thickness of the first jaw portion; and a pair of tip tapered blades that are disposed on both sides of the end face and whose blade width is continuously increased toward the rear end. The tip tapered blades of the point blade are provided at the rear end face with a pair of tapered blades that are bent at an obtuse angle to respective attaching portions and are disposed in a direction in which a distance therebetween is increased toward the respective first parallel shearing blades. Thus, shearing stress is favorably produced on the end face whose width is smaller than the thickness of the first jaw portion and the width receiving blade by pressing force from the hydraulic drive system and the point of the tip blade easily bites into even an object to be sheared of a high-strength aluminum alloy and forms a pierced hole there.

In a tip blade receiving blade of the present invention, a point blade receiving blade portion comprised of a width receiving blade and a pair of tip tapered blade receiving blades is disposed such that the point blade receiving blade portion is inclined in a direction opposed to the first jaw portion. Thus, it is possible to prevent the point from being displaced from a pressing spot and more favorably concentrate hydraulic pressure on the pressing spot by adjusting an inclination angle so that a pressing direction of the end face of the point blade is perpendicular to an object to be sheared.

With respect to a shearing angle, which is an angle of an opening between blades opposed to each other of shearing blades of the present invention, the following takes places in case of linear blades: force required for cutting is reduced by angling either cutting tool (a cutting tool on the movable side in ordinary cases) and a neat cut edge is obtained by continuously proceeding with cutting operation in one direction. By increasing a shearing angle, a "maximum shearing force" is reduced and the power of a shear (cutting machine) can be reduced. As a shearing angle is increased, however, a bend or a twist is increased during cutting, the dimensions of a plate differs between start of cutting and end of cutting, or other like phenomena occur and the quality or grade of a sheared product is impaired.

Further, the quality of a cut edge, required shearing force or lateral force, or the like varies depending on the size of a gap (clearance) between opposite blades of the shearing blades of the present invention. For some shears, a standard value for clearance value is often specified with respect to a thickness of a plate to be cut or some steel type categories. However, since the property (quality) of a cut edge varies depending on a difference in mechanical property of a material to be cure, machine accuracy, blank holding force, or the like, it is advisable to select an optimal clearance. For example, for a plate thickness of 20 mm, a clearance equal to 20% of the thickness is taken.

A dismantling working vehicle for large aircrafts can be obtained by attaching a shearing machine for dismantling large aircrafts of the present invention to the tip of a hydraulically actuated boom swivelably and lowerably/raisably mounted on an automotive vehicle.

Example

Figure 2:
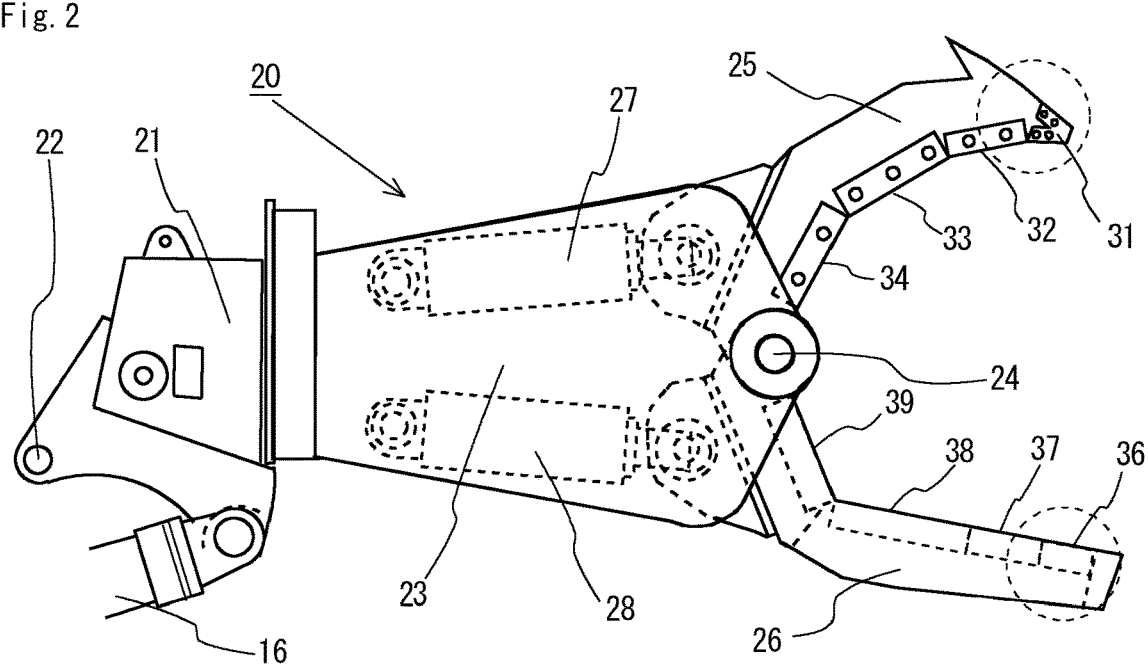
FIG. 2 is an explanatory drawing illustrating a configuration of the shearing machine for dismantling large aircrafts shown in FIG. 1.

FIG. 1 is an explanatory drawing illustrating a configuration of an example of a dismantling working vehicle for aircrafts equipped with a shearing machine for dismantling large aircrafts of the present invention. FIG. 2 is an explanatory drawing illustrating a configuration of the shearing machine for dismantling large aircrafts shown in FIG. 1. FIGS. 3(a) to 3(c) are an enlarged view, a side view, and a plan view of a tip blade of a first jaw portion of the shearing machine for dismantling large aircrafts shown in FIG. 2. FIG. 3(d) is a side view of the first jaw portion, and FIG. 3(e) is a plan view of showing the tip blades of the first jaw portion. FIG. 4(a) is an enlarged plan view, FIG. 4(b) is a side view, and FIG. 4(c) is a plan view of a tip blade receiving blade of a second jaw portion shown in FIG. 2. FIGS. 5(a) to 5(d) are explanatory drawings illustrating shearing operation of a principal part of the shearing machine for dismantling large aircrafts shown in FIG. 2. FIGS. 6(a) to 6(d) are explanatory drawings illustrating a configuration of a shearing machine for dismantling large aircrafts in another implementation.

As shown in FIG. 1, a dismantling working vehicle 10 for large aircrafts in the present example is comprised of: an automotive vehicle 11; and a dismantling shearing machine 20 attached to the tip of a hydraulically actuated boom 14 swivelably and lowerably/raisably mounted on the automotive vehicle 11. More specifically, the automotive vehicle 11 is mounted with a swiveling stage 12 driven by engine output or electric power supplied from an external power source.

The stage 12 is provided on the front left side of the stage with a driver's cabin 13 such that the cabin faces forward during driving. At the central part of the stage, the hydraulically actuated boom 14 is rotatably supported by a derricking cylinder 15 such that the boom can be raised/lowered and the boom 14 has at the tip thereof the dismantling shearing machine 20 rotatably supported in a lowerable/raisable manner by a hydraulic driving means 16 comprised of a hydraulic piston and a cylinder. An oil pressure generating device 17 is mounted behind the stage 12. When the vehicle 11 is transported by a trailer truck or the like, the boom 14 is lowered or raised to a predetermined angle or folded.

As illustrated in FIG. 2, the shearing machine 20 for dismantling large aircrafts is freely held on a frame device 21 including a frame base rotated by a rotating means, not shown. The frame device 21 is attached such that the frame device can be inclined toward the hydraulically actuated boom 14 at a fulcrum 22. The frame device 21 is rotated and lowered/raised to various angles by driving the rotating means and the hydraulic driving means 16 through operation from the driver's cabin 13.

The dismantling shearing machine 20 includes: a body portion 23 having two panels installed on the frame base of the frame device 21; a first jaw portion 25 and a second jaw portion 26 disposed between the two panels of the body portion 23 and relatively rotated around a fulcrum 24 between an open position and a closed position; a first hydraulic driving means 27 that rotates the first jaw portion 25 around the fulcrum 24; and a second hydraulic driving means 28 that rotates the second jaw portion 26 around the fulcrum 24.

The first jaw portion 25 includes: as shearing blades located ahead of the fulcrum 24, a tip blade whose point bites first into an object to be sheared; a pair of first parallel shearing blades 33 that are bent at an obtuse angle to the direction of biting of the tip blade and respectively disposed on both sides of the first jaw portion 25; and a pair of second parallel shearing blades 34 that are bent at an obtuse angle to an attaching portion of the first parallel shearing blades and respectively disposed on both sides of the first jaw portion 25. The tip blade is composed of a point blade 31 and a pair of tapered blades 32.

As shearing blades located ahead of the fulcrum 24, the second jaw portion 26 also has: a groove portion 35 which all of the tip blade and the pair of first parallel shearing blades 33 and part of each of the pair of second parallel shearing blades 34 penetrate during relative movement with the first jaw portion 25 and which is disposed so as to surround the outer circumferential surface of the tip blade; a tip blade receiving blade 36 that surrounds an outer circumference which the tip blade penetrates and is disposed along the inner wall surface of the groove portion 35 except an area where the first parallel shearing blade areas penetrate; a pair of first parallel shearing blade receiving blades 38 respectively disposed along the inner wall surface of the groove portion 35 in an area where each of the first parallel shearing blades 33 penetrates; and a pair of second parallel shearing blade receiving blades 39 respectively disposed along the inner wall surface of the groove portion 35 in an area where each of the second parallel shearing blades 34 penetrates.

A more specific description will be given. The tip portion of the first jaw portion 25 in FIG. 2 is detachably attached to the tip portion of the first jaw portion 25. As shown in FIGS. 3(a) to 3(e), the point blade 31 of the tip blade has an end face 31a whose blade width is smaller than the thickness of the first jaw portion 25 and which can be abutted against an object to be sheared. As shown in FIGS. 4(a) to 4(c), the longitudinal side of the end face 31a in the direction of width is disposed opposite to the width receiving blade 36a of the tip receiving blade 36 of the second jaw portion 26 and the end face 31a is caused to make a hole by shearing between these width sides.

A pair of tip tapered blades 31b are disposed on both sides of the end face 31a such that the blade width is continuously increased as they go towards the rear end. The outer ridge portions of the pair of tip tapered blades 31b act as a cutting portion. When the first jaw portion 25 and the second jaw portion 26 are rotated and meet together, the pair of tip tapered blades 31b and the tip tapered blade receiving blades 36b are rubbed with each other and an object to be sheared is sheared.

An attaching bolt (not shown) for attaching the point blade 31 of the tip blade to the first jaw portion 25 can be removed and the point blade 31 can be rotated by 180° around an axis going through the center of the end face 31a. Thus, when the blade of one end face 31a and one tip tapered blade 31b are worn, they can be replaced with the opposite end face 31a and tip tapered blade 31b and the life of the point blade 31 can be doubled.

As shown in FIG. 2 and FIG. 3(a), a pair of tapered blades 32 are disposed at the respective rear end faces of the pair of tip tapered blades 31b of the first jaw portion 25. The pair of tapered blades 32 are bent at an obtuse angle to respective attaching portions of the pair of tip tapered blades and disposed such that a distance therebetween is increased toward the subsequent respective first parallel shearing blades 33. As shown in FIG. 4, tapered blade receiving blades 37 are provided on the second jaw portion 26 in positions opposite the tapered blades 32.

The pair of tapered blades 32, the pair of first parallel shearing blades 33, and the pair of second parallel shearing blades 34 and the pair of tapered blade receiving blades 37, the pair of first parallel shearing blade receiving blades 38, and the pair of second parallel shearing blade receiving blades 39 opposed thereto are formed of a rectangular parallelepiped, replaceable blade and their four longitudinal sides are configured as a shearing blade. Therefore, the life of each shearing blade can be quadruplicated by removing individual attaching bolts (not shown), replacing each shearing blade with another, and attaching them.

Figure 5A:
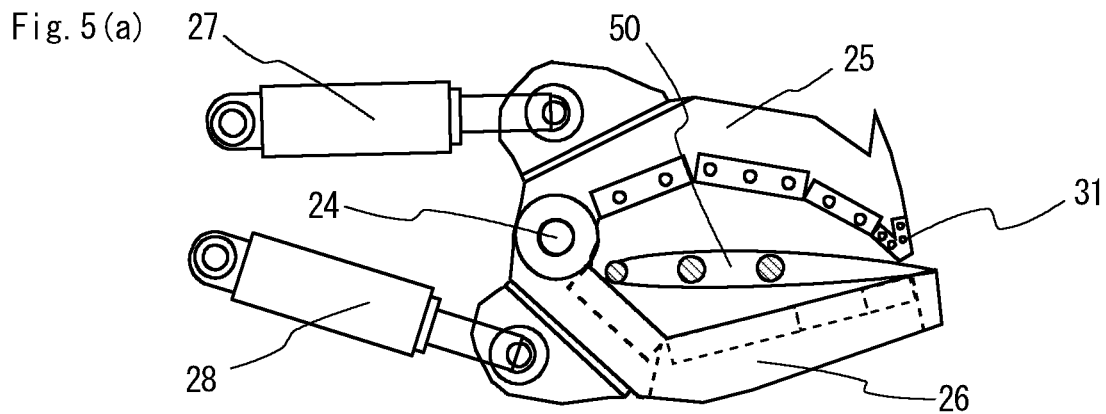
FIGS. 5(a) to 5(d) are explanatory drawings illustrating shearing operation of a principal part of the shearing machine for dismantling large aircrafts shown in FIG. 2.

A description will be given to motion of the first jaw portion 25 and the second jaw portion 26 with a case where a wing-shaped object 50 to be sheared is to be sheared being taken as an example. As shown in FIG. 5a, the first jaw portion 25 and the second jaw portion 26 as are opened are gradually closed. In this case, the first jaw portion 25 and the second jaw portion 26 are so adjusted that the end face 31a of the point of the tip blade 31 of the first jaw portion 25 is pressed against the object 50 to be sheared substantially in a perpendicular direction (FIG. 5(a)).

Figure 5B:
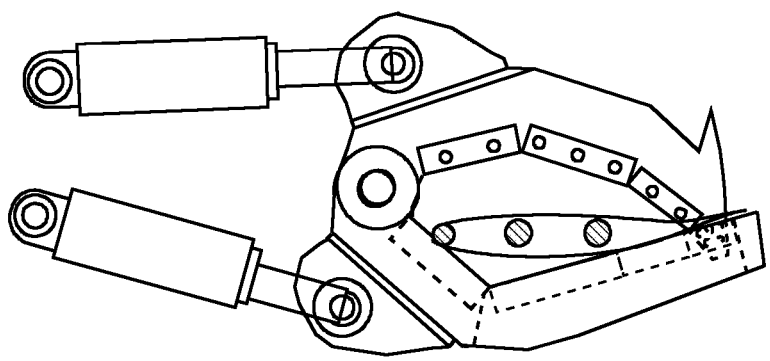

As shown in FIG. 5(b), the first hydraulic driving means 27 and the second hydraulic driving means 28 are driven from the state shown in FIG. 5a to press and cause the end face 31a to bite into the object 50 to be sheared. A more specific description will be given. As shown in FIGS. 3(a) to 3(c), the tip blade 31 has a width smaller than the thickness of the first jaw portion 25 and has the end face 31a that can be abutted against an object to be sheared substantially in a perpendicular direction. The tip blade is abutted against the object 50 to be sheared substantially in a perpendicular direction and the first jaw portion 25 and the second jaw portion 26 are rotated by the respective hydraulic driving means 27, 28. For this reason, pressing force favorably produces shearing stress and the point of the tip blade easily bites into even the object to be sheared of a high-strength aluminum alloy, a pierced hole being thereby formed there.

Figure 5C:
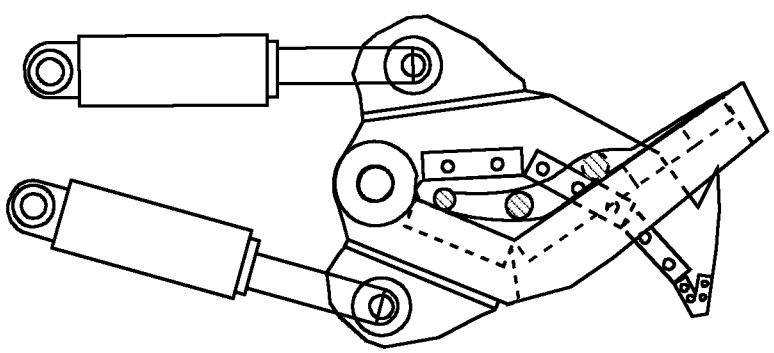
Figure 5D:
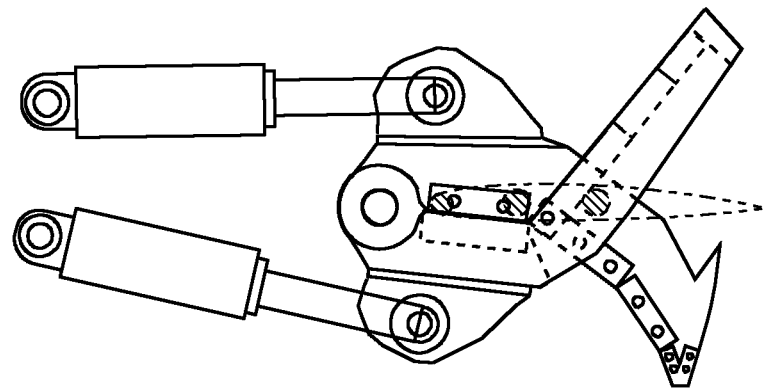

As the tip blade 31 bites, the pierced hole is gradually widened. While the workpiece is sheared by the tip tapered blade receiving blades 36b of the tip blade receiving blade 36, as shown in FIG. 5b to FIG. 5c, a through hole is formed through shearing by the first parallel shearing blades 33 and first parallel shearing blade receiving blades 38 on the fulcrum 24 side. As shown in FIG. 5d, the object 50 to be sheared is sheared through shearing by the second parallel shearing blades 34 and the second parallel shearing blade receiving blades 39.

FIGS. 6(a) to 6(d) are explanatory drawings illustrating a configuration of a shearing machine for dismantling large aircrafts in another example; FIG. 6(a) is a side view; FIG. 6(b) is a plan view of the second jaw portion 66, FIG. 6(c) is an enlarged view of a tip blade; and FIG. 6(d) is an enlarged view of a tip blade receiving blade. In the shearing machine 60 for dismantling large aircrafts in the example shown in FIGS. 6(a) to 6(c), as in the example shown in FIG. 2, a first jaw portion 65 and a second jaw portion 66 are disposed between two panels of a body portion 63 and relatively rotated around a fulcrum 64 between an open position and a closed position by a first hydraulic driving means 67 and a second hydraulic driving means 68.

Like the first jaw portion 25 in FIG. 2, the first jaw portion 65 includes a tip blade, a pair of first parallel shearing blades 73, and a pair of second parallel shearing blades 74. At the point blade 71 of the tip blade, there are provided an end face 71a and a tip tapered blade 71b. At the rear end thereof, there are provided a pair of tapered blades 72, a pair of first parallel shearing blades 73, and a pair of second parallel shearing blades 74. On the inner wall of the groove portion 75 which the tip of the first jaw portion 65 penetrates, the second jaw portion 66 includes: a tip blade receiving blade 76 comprised of a width receiving blade 76a and a tip tapered blade receiving blade 76b; tapered blade receiving blades 77; first parallel shearing blade receiving blades 78; and second parallel shearing blade receiving blades 79. The tip blade is composed of a point blade 71 and a pair of tapered blades 72.

In such a second jaw portion 66, a tip blade receiving blade 76 portion comprised of the width receiving blade 76a and the pair of tip tapered blade receiving blades 76b is disposed such that the tip blade receiving blade portion is inclined in a direction opposed to the first jaw portion 65. Thus, it possible to prevent the point from displacing from a pressing spot and favorably concentrate hydraulic pressure on the pressing spot by adjusting an inclination angle so that the pressing direction of the end face of the point blade is perpendicular to an object to be sheared.

REFERENCE SIGNS LIST

10: dismantling working vehicle for large aircrafts,
11: automotive vehicle,
12: swiveling stage,
13: driver's cabin,
14: hydraulically actuated boom,
15: derricking cylinder,
16: hydraulic driving means,
17: oil pressure generating device,
20, 60: dismantling shearing machine,
21: frame device,
22: fulcrum,
23, 63: body portion
24, 64: fulcrum,
25, 65: first jaw portion,
26, 66: second jaw portion,
27, 67: first hydraulic driving means,
28, 68: second hydraulic driving means,
31, 71: point blade,
31a, 71a: end face,
31b, 71b: tip tapered blade,
32, 72: tapered blade,
33, 73: first parallel shearing blade,
34, 74: second parallel shearing blade,
35, 75: groove portion,
36, 76: tip blade receiving blade,
36a, 76a: width receiving blade,
36b, 76b: tip tapered blade receiving blade,
37, 77: tapered blade receiving blade,
38, 78: first parallel shearing blade receiving blade,
39, 79: second parallel shearing blade receiving blade,
50: object to be sheared,

The invention claimed is:

1. A shearing machine for dismantling large aircrafts comprising:
   a first jaw portion and a second jaw portion that shear an object to be sheared by shearing blades outfitted such that the shearing blades are relatively rotated between an open position and a closed position; and
   a hydraulic driving means that rotates the first jaw portion and/or the second jaw portion,
   wherein the shearing blades of the first jaw portion includes:

a tip blade which has a width the same as a thickness perpendicular to a rotation direction of the first jaw portion, is disposed in a tip area of the first jaw portion, and bites into an object to be sheared; and a pair of tapered blades that adjoin the tip blade and are respectively disposed on two sides of the first jaw portion;

a pair of first parallel shearing blades that adjoin to the respective tapered blades and are respectively disposed on two sides of the first jaw portion; and a pair of second parallel shearing blades that adjoin and are angled at an obtuse angle to the first parallel shearing blades and are respectively disposed on two sides of the first jaw portion, wherein the tip blade has an end face that is disposed at a tip of the first jaw portion to abut first against the object to be sheared, and a pair of tip tapered cutting edges that are disposed on two sides of the end face, the tip blade having a blade width continuously increasing toward a rear end; and the pair of tapered blades are angled at an obtuse angle to the tip tapered cutting edges and disposed in a direction in which a distance between the pair of tapered cutting edges is increased rearward, and wherein the shearing blades of the second jaw portion includes:

a groove portion that penetrably receives all of the tip blade, the pair of tapered blades and the pair of first parallel shearing blades and part of each of the pair of second parallel shearing blades during relative movement with the first jaw portion;

a tip blade receiving blade disposed on an inner wall surface of the groove portion having a shape corresponding to the tip blade so as to face an outer circumferential surface of the tip blade;

a pair of first parallel shearing blade receiving blades respectively disposed along the inner wall surface of the groove portion in an area where two outer circumferential surfaces of the first parallel shearing blades penetrate; and a pair of second parallel shearing blade receiving blades respectively disposed along the inner wall surface of the groove portion in an area where two outer circumferential surfaces of the second parallel shearing blades penetrate.

2. The shearing machine for dismantling large aircrafts according to claim 1,
wherein the hydraulic drive system separately includes a first hydraulic driving means for rotating the first jaw portion and a second hydraulic driving means for rotating the second jaw portion.

3. The shearing machine for dismantling large aircrafts according to claim 1,
wherein the tip blade receiving blade includes a width receiving blade opposed to a periphery of the end face of the tip blade, a pair of tip tapered cutting edge receiving blades that rub together with the tip tapered cutting edges of the tip blade, and a pair of tapered blade receiving blades that rub together with the pair of tapered blades, which are formed separately.

4. The shearing machine for dismantling large aircrafts according to claim 1,
wherein the hydraulic drive system means separately includes a first hydraulic driving means for rotating the first jaw portion and a second hydraulic driving means for rotating the second jaw portion,
wherein the tip blade receiving blade includes a width receiving blade opposed to a periphery of the end portion face of the tip blade, a pair of tip tapered cutting edge receiving blades that rub together with the tip tapered cutting edges of the tip blade, and a pair of tapered blade receiving blades that rub together with the pair of tapered blades.

5. A working vehicle for dismantling large aircrafts, comprising the shearing machine for dismantling aircrafts according to claim 1, and a hydraulically actuated boom swivelably and lowerably/raisably mounted on an automotive vehicle, the shearing machine being attached to the boom.

* * * * *